(12) United States Patent
Wang et al.

(10) Patent No.: US 8,311,705 B2
(45) Date of Patent: Nov. 13, 2012

(54) CONSTANT FORCE CONTROL METHODOLOGY FOR SHOCK ABSORPTION

(75) Inventors: Gang Wang, Bethesda, MD (US); Norman Wereley, Potomac, MD (US); Gregory Hiemenz, Silver Spring, MD (US); Young-Tai Choi, Laurel, MD (US)

(73) Assignees: Techno-Sciences, Inc., Calverton, MD (US); University of Maryland, College Park, MD (US)

( * ) Notice: Subject to any disclaimer, the term of this patent is extended or adjusted under 35 U.S.C. 154(b) by 213 days.

(21) Appl. No.: 12/870,963

(22) Filed: Aug. 30, 2010

(65) Prior Publication Data
US 2010/0332079 A1 Dec. 30, 2010

Related U.S. Application Data

(63) Continuation-in-part of application No. 11/819,875, filed on Jun. 29, 2007, now Pat. No. 7,878,312, and a continuation-in-part of application No. 11/670,773, filed on Feb. 2, 2007, now Pat. No. 7,822,522, and a continuation-in-part of application No. 11/670,761, filed on Feb. 2, 2007, now Pat. No. 7,921,973.

(60) Provisional application No. 61/335,469, filed on Jan. 7, 2010.

(51) Int. Cl.
*B60G 17/018* (2006.01)

(52) U.S. Cl. .......................................... 701/37; 701/38
(58) Field of Classification Search .................... 701/37, 701/38; 53/449, 139.5
See application file for complete search history.

(56) References Cited

U.S. PATENT DOCUMENTS

| | | | | |
|---|---|---|---|---|
| 3,735,952 | A * | 5/1973 | Platus et al. | 248/562 |
| 7,516,597 | B1 * | 4/2009 | Roose | 53/449 |
| 7,822,522 | B2 * | 10/2010 | Wereley et al. | 701/45 |
| 7,878,312 | B2 * | 2/2011 | Hiemenz et al. | 188/377 |
| 7,921,973 | B2 * | 4/2011 | Wereley et al. | 188/266 |

* cited by examiner

*Primary Examiner* — Gertrude Arthur Jeanglaude
(74) *Attorney, Agent, or Firm* — Ober, Kaler, Grimes & Shriver; Royal W. Craig

(57) ABSTRACT

A Constant Force Control methodology and system utilizing integrated sensors and unique control algorithms to determine required applied force to mitigate shock events in an adaptive energy absorption system, typically comprising of a spring and an adjustable energy absorber or damper element. By utilizing an expected acceleration profile and event duration for an anticipated shock event an acceleration amplitude can be determined from a measure impact velocity. From this and a measured payload mass a system controller can determine the force necessary to be applied by the energy absorber in order to stop the payload over the full desired length of the available energy absorber stroke in order to minimize the forces experienced by the payload.

11 Claims, 7 Drawing Sheets

Simplified Shock Acceleration Pulses: (a) Triangular, (b) Half-Sine, (c) Square, (d), Combination Constant Force Control System Configuration The impact of seat system MSD model a) Displacement b) Velocity Simulation results of payload under 8 g 50 ms acceleration pulse 5%tile female 10 g drop testing results using constant force controller 50%tile male 10 g drop testing results using constant force controller

CONSTANT FORCE CONTROL METHODOLOGY FOR SHOCK ABSORPTION

CROSS-REFERENCE TO RELATED APPLICATION(S)

The present application derives priority from U.S. provisional application Ser. No. 61/335,469 filed 7 Jan. 2010, and is a continuation-in-part of application Ser. No. 11/819,875, filed Jun. 29, 2007 now U.S. Pat. No 7,878,312, and is a continuation-in-part of application Ser. No. 11/670,773 filed Feb. 2, 2007 now U.S. Pat. No. 7,822,522, and is a continuation-in-part of application Ser. No. 11/670,761, filed Feb. 2, 2007 now U.S. Pat. No. 7,921,973.

BACKGROUND OF THE INVENTION

1. Field of the Invention

The present invention relates to a method of controlling a shock energy absorption system to minimize instantaneous payload acceleration. More particularly, the invention is a system and method for determining and applying with an energy absorption system the required constant oppositional force to achieve optimal energy dissipation over the full or partial stroke of an absorber so as to minimize the instantaneous load on the payload.

2. Description of the Background

The minimization of shock load-induced injury is a critical issue in seat suspension design. Seat occupants can suffer spinal, pelvic and other injuries as a result of harsh vertical/crash landings of aircraft, a problem to which rotorcraft are particularly susceptible. Extreme vertical shock loads are also experienced by land and marine vehicles during high speed operations and in harsh environmental conditions. The presence of vertical impact force attenuation systems in vehicle crashes is one of the primary factors in determining occupant survivability. Further, the risk and severity of an injury to vehicle occupants can be considerably reduced if the vehicle is equipped with crashworthy seat designs including seat suspension systems that can mitigate the vertical shock loads. In addition, such shock absorber system can isolate occupants from harmful operational vibrations, mitigate severe and repetitive operational impact shocks, and protect vital devices and electronics.

Conventional passive shock mitigation approaches are limited by their inability to adapt to varying shock levels or payload (occupant) weights. More specifically, passive suspension systems may be tuned for a maximum expected shock amplitude and/or the heaviest expected occupant weight but would provide far from optimal results for smaller payloads and/or in lower amplitude shock conditions. In such a case, the load transmitted to the payload via the shock absorber would be unnecessarily high (causing an unnecessary risk of injury) and the full dissipative capability of the entire absorber stroke would not be used. Alternatively, if the passive suspension system were tuned for lower amplitude shock and/or a lower payload (occupant) weight, the suspension would be too "soft" for a heavier payload or higher amplitude shock condition, more often resulting in the absorber meeting is stroke end-stop (i.e. bottoming out), again causing an unnecessary risk of injury.

There has thus been significant interest in both the private and public (military) sectors in developing an adaptive energy absorption system that will automatically adjust its energy absorbing characteristics to payload (occupant) weight and real-time environmental measurements. U.S. patent application Ser. Nos. 11/670,773 and 11/670,761 (both titled Adaptive Energy Absorption System for Vehicle Seat filed Feb. 2, 2007) by the present applicant are two such systems, each of which is incorporated herein by reference. An effective method of controlling such adaptive energy absorption system is needed in order to achieve the shock mitigation goal. Additional relevant patents include U.S. Pat. No. 6,732,033 (2004) to LaPlante et al., U.S. Pat. No. 6,311,110 (2001) to Ivers et al. U.S. Pat. No. 6,112,866 (2000) to Boichot et al. and U.S. Pat. No. 5,276,622 (1994) to Miller et al.

SUMMARY OF THE INVENTION

It is an object of the present invention to prevent vehicle occupant injury and/or protect critical electronic/devices during shock events.

It is another object of the present invention to minimize the shock induced load experienced by the occupant/payload by utilizing the full or desired stroke of the energy absorption system.

It is another object of the present invention to provide a control signal to an energy absorber in conjunction with an energy absorption system to cause the absorber to apply the necessary oppositional force.

Accordingly, there is provided a Constant Force Control system that utilizes measured shock impulse information from integrated sensors and a physics-based control model to determine the required constant oppositional control force and signal the energy absorber of the energy absorption system to apply the necessary force. Sensors monitor in real time the payload mass and vehicle velocity in anticipation of a shock event. During a shock event, the constant force controller automatically determines acceleration impulse peak based on the measured velocity and a predetermined expected vehicle acceleration curve and impulse duration. The system then determines the required oppositional force in view of the payload mass and signals the adjustment of the energy absorber to apply the determined amount of force.

DETAILED DESCRIPTION OF THE INVENTION

The control system according to the present invention will be herein shown in the context of a shock energy absorption system for a vehicle seat, although the invention is applicable to any payload shock energy minimization application. In the vehicle seat context, the control system includes a plurality of vehicle-mounted components including a controller (processor with memory), a sensor (e.g. displacement, velocity, accelerometer, altimeter, proximity etc.) connected to the processor to determine the impact velocity of the vehicle, and an adaptive energy absorber (EA) operatively connected between the vehicle seat and vehicle frame.

EA is herein defined as any suitable device used to absorb energy by providing a resistive force applied over a deformation distance without significant elastic rebound. EAs damp applied forces but do not store them to any significant degree (as do coil springs). EAs include fixed profile energy absorbers (FPEAs) which have a constant load-stroke curve, such as standard hydraulic or pneumatic cylinders. FPEAs are passive, meaning that they cannot adapt their energy absorption or stroking profiles as a function of occupant weight, or as a function of real-time environmental measurements such as a crash velocity, vibration or shock load. These variables are essential if vibrations and/or impact energy is to be absorbed most efficiently. Seat suspension systems that utilize FPEAs suffer from these and other drawbacks.

EAs also include variable profile energy absorbers (VPEAs), which are herein defined as any adjustable EA that can modify its energy absorbing capabilities in realtime under command of a feedback control system. VPEAs impart a controlled resistive force that can be continuously adjusted over a known deformation distance of the VPEA. Since the resistive force can be continuously adjusted over the deformation distance, the VPEA can be controlled in real time to respond to changing environmental stimuli including load levels to effectively mitigate loads into the occupant's body. Suitable VPEAs may comprise any of an active valve damper, a magnetorheological fluid damper, an electrorheological fluid damper, a magnetic energy absorber, and a servo-hydraulic actuator. Active valve dampers are pneumatic or hydraulic cylinders that rely on internal valving changes to automatically adjust their damping effect. Active valve dampers with electrically controlled damping constants are known in the art, and typically use variable valve orifices to adjust the damping force.

Figure 1:
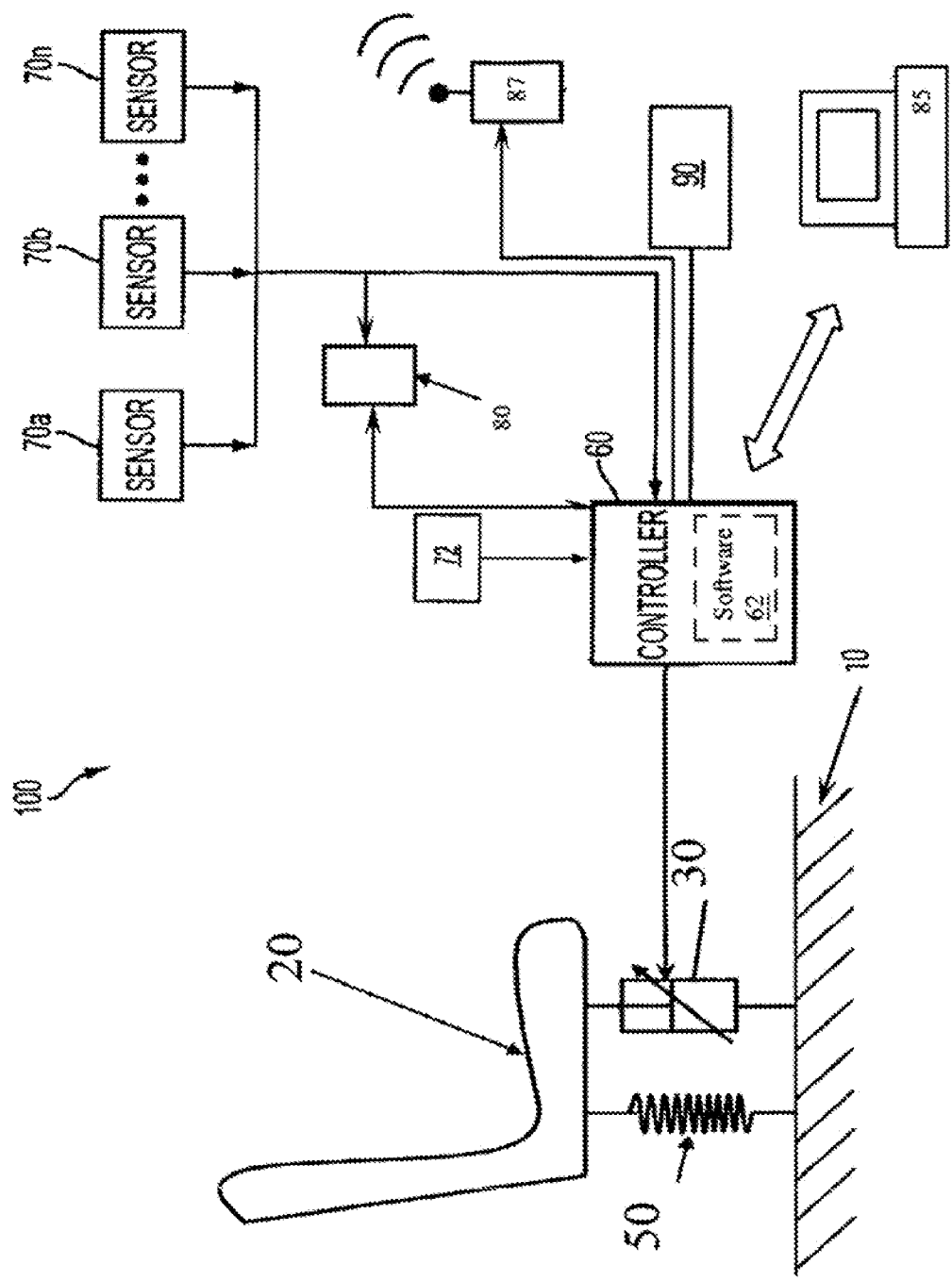
FIG. 1 is an exemplary illustration of a suitable adaptive energy absorption system 100 for a vehicle seat, according to an embodiment of the invention.

FIG. 1 is an exemplary illustration of a suitable adaptive energy absorption system 100 for a vehicle seat, according to an embodiment of the invention. The seat 20 may be any type of vehicle seat including, but not limited to, aircraft (e.g., rotorcraft, fixed wing, etc.) seats, land vehicle seats (e.g., seats for heavy-duty military, agricultural, and construction vehicles, etc.), marine vehicle seats, or seats for other vehicles that may experience shock loads. A VPEA 30 is operatively connected to vehicle seat 20, and to a base 10 which may be any supporting structure of the vehicle (such as the vehicle frame or extension thereof). In a preferred embodiment, a stiffness element 50 operatively connected, preferably in parallel, between the vehicle seat 20 and the supporting structure of the vehicle for vibration isolation. Although the stiffness element 50 may have a fixed stiffness profile and may operate as a passive element, it may alternatively have a variable stiffness profile and function as a semi-active, or active element. One skilled in the art should understand that a single controller 60 may be used to control multiple VPEA 30-equipped seats 20 as depicted in FIG. 1.

A programmable controller 60 is in communication with VPEA 30. Controller 60 includes memory for storing and running control software 62 that automatically adjusts VPEA 30 in real-time to an optimal setting based on feedback from a weight indication mechanism 72 and/or one or more sensors (70a, 70b, . . . 70n), and in accordance with a library of predetermined shock acceleration profiles 63 also stored in controller memory 60 as will be described.

Controller 60 may comprise a processor, as well as a memory for storing control software 62 which comprises one or more control algorithms for execution by the processor. The memory also stores data that may be used and/or produced by execution of the one or more control algorithms. Controller 60 interfaces with, and receives measurement signals (controller inputs) from, one or more sensors (70a, 70b, . . . 70n) and/or weight indication mechanism 72. Based on processing performed, controller 60 interfaces with, and generates one or more control signals (controller outputs) to control VPEA 30.

VPEA 30 may comprise any suitable adaptive energy absorber that can adjust its load profile as commanded by controller 60 in real time, as vehicle seat 20 strokes, for example, during a crash or other vehicle shock event. MR and ER energy absorbers, in particular, are advantageous because they are able to achieve what is effectively an infinitely adjustable profile energy absorber. MR fluid dampers, in particular, are advantageous in that they are easily powered by a DC electrical supply (e.g., battery) which facilitates the provision of an independent power source (e.g., power source 90), as described above.

Suitable MR damper designs may be found in U.S. Pat. No. 6,694,856 B1 (issued Feb. 24, 2004), entitled "MAGNETORHEOLOGICAL DAMPER AND ENERGY DISSIPATION METHOD" to Chen et al., which is hereby incorporated by reference herein in its entirety.

Preferably, at least one sensor 70 is provided on vehicle seat 20, and one sensor may be provided on base 10 of the vehicle (e.g., on the floor of the vehicle, or on a platform or other structure to which vehicle seat 20 may operatively connected) so that the input load levels as well motion of the occupant (both absolute & relative) may be determined. Sensors 70a, 70b, . . . 70n may measure force (e.g, load cells), acceleration (e.g., accelerometers), velocity (e.g., PVTs, etc.), strain/displacement (e.g., LVDT, strain gauge, etc), deformation (e.g., a frangible wire or fiber-optic line that, when broken or bent, indicates the onset of shock, and optionally measuring it), vehicle position, and/or vehicle attitude. One or more of sensors 70a, 70b, . . . 70n may comprise existing vehicle sensors (e.g., an aircraft altimeter to measure sinkrate). A plurality of sensors may be distributed throughout the vehicle near locations of high probability of shock onset, such as front or rear crumple zones, or at the four corners of the vehicle footprint (as shown) in an effort to enable sufficient time for the controller 60 to adjust, via a control signal, the VPEA 30 prior to the shock event actually reaching the vehicle seat 20 and occupant. In a preferred embodiment, the weight indication mechanism 72 is a conventional strain gauge or other like mechanism used to obtain an occupant's weight (or mass) to tune the system to the occupant. The components of system 100 may be powered by a power source 90. The power source 90 may comprise an existing power source associated with the vehicle. Alternatively, power source 90 may comprise a source (e.g., one or more batteries) independent of the vehicle so as to enable system 100 to continue to function in the event of a loss of vehicle power due to, for example, a shock event, or for any other reason. System 100 may be powered by a power source associated with the vehicle, while power source 90 serves as a "back-up," independent power source which will activate upon a loss of vehicle power.

Stiffness element 50 may operate passively, semi-actively, or actively, and may have a fixed or variable stiffness profile. Examples of stiffness element 50 may include, but are not limited to, coil springs, leaf springs, visco-elastic material, or any spring or spring system having a natural harmonic frequency which, when a vibration frequency is applied, will resonate. Stiffness element 50, if used, may be implemented such that it provides, a tuned stiffness for vibration control (preferably soft to reduce transmissibility). The tuning of this stiffness is important because its use may sacrifice some stroke of the VPEA 30 during a shock event. Use of a variable stiffness spring (vs. fixed stiffness) may be advantageous because it would enable tuning to varying occupant masses. The stiffness element 50 may be variable, adjusted by a manual control mechanism (e.g., a dial), or automatically adjusted based upon an occupant mass measurement. In addition, according to the present invention, the stiffness element 50 performs a recoil and recovery function to return the VPEA 30 to substantially its initial position after a first shock event quickly enough to perform its function for a subsequent shock event.

If desired, a data logger 80 may be provided to store and record information related to the shock and/or vibration such as measurements thereof. The data logger 80 may be connected directly to the sensors 70a-70n to log the sensor data in internal memory for later download to a computer. There are a variety of conventional data loggers that will suffice for this purpose, including DATAQ™ Instruments line of Data Logger products for Stand-alone and PC connected Applications. The data logger may also be embedded into the controller 60 itself, whereas the controller's microprocessor stores the sensor data or processed sensor data (i.e., filtered, mathematical operations, etc.) onto onboard memory, such as internal microprocessor memory, an on board hard drive, or other onboard memory (i.e, removable or non-removable solid state memory, removable media, etc). The data logger 80 and/or removable memory/media may also be connected to the controller 60 and/or in communication with a remote host computer 85 for analysis, evaluation, and/or storage of the data. For example, the data may be analyzed to provide a vehicle and/or personnel dosimetry capability, in which logged shock and/or vibration data is used to keep record of vehicle and/or vehicle occupant exposure for health/maintenance purposes. The controller 60 may be programmed to compare sensor data to predetermined thresholds to determine shock events and/or vibration exposure exceeding defined limits.

Figure 2:
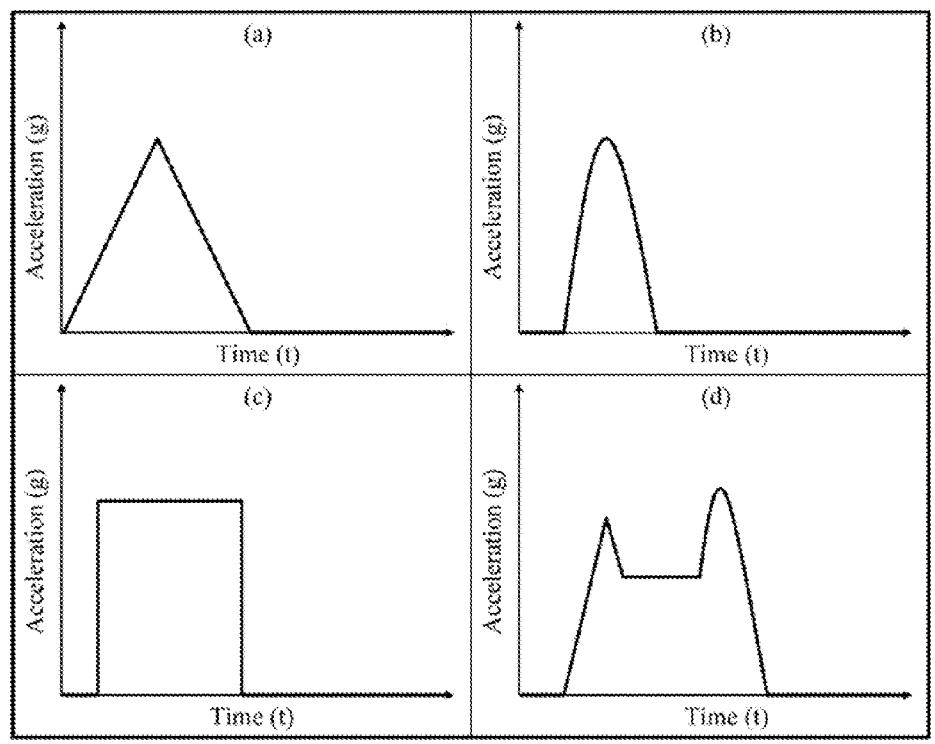
FIG. 2 is a simplified depiction of certain shock acceleration profiles.

The controller 60 references a library of predetermined shock acceleration profiles 63 stored in controller memory. FIG. 2 illustrates a variety of exemplary shock acceleration profiles in graphical form. Each profile (a-d) represents simplified shock acceleration over time for a typical shock event caused, for example, by front impact, drop, bump, etc. Each shock acceleration profile is generally characterized by a peak acceleration, duration, and general shape of the shock pulse (half sine, triangular as at (a), bell-shaped as at (b), stepped as at (c), trapezoidal, compound as at (d), etc), in a simplified (smoothed) format omitting transient pulses as would be measured by an accelerometer during a real time shock event.

FIG. 2 is a block diagram illustrating the method of the present invention during a real-time shock event, in which one of sensor 70a, for example, is a velocity sensor). At step 12, prior to impact, the sensor 70a monitors velocity and communicates this to the controller 60. At step 10, either before impact or immediately thereafter, the controller 60 selects one of the shock acceleration profiles (of FIG. 1). This selection may be made beforehand based entirely on pre-existing characteristics, or can be based in part on the measured initial impact velocity or external system such as vehicle system, etc. At step 14 the controller 60 analyzes the sensor-measured impact velocity in conjunction with the selected shock acceleration profile (including anticipated event duration) to determine a peak acceleration impulse. At step 16 the controller 60 computes in real time the required dissipation force needed to offset the anticipated shock event and control the VPEA 30 (connected between the vehicle seat and vehicle frame) to mitigate shock. Specifically, the controller 60 calculates the oppositional force required to be applied between the payload and supporting structure by the VPEA 30 to maximize shock mitigation over its known or available stroke length. The calculation of step 16 requires knowledge of the payload mass which, as shown at step 18, may be pre-determined, manually entered, or may be sensed by weight sensor 72. Lastly, at step 20 the controller 60 outputs a command signal to the adaptive energy absorber to apply and maintain the calculated oppositional/dissipation force.

The anticipated form of the shock acceleration pulse curve for a particular event may be selected based on known or anticipated but simplified impact parameters including the type of vehicle in which the payload is situated and the form and material of the impacted body. The information regarding the shock impulse is fed, along with the payload weight, into the controller 60 utilizing a physics-based model to determine the expected acceleration of the payload during the course of the event. From this, the required real-time opposing or dissipative force applied to the payload by VPEA 30 can be determined and the VPEA 30 signaled to apply the determined force. According to the preferred embodiment of the present invention, shock mitigation is maximized (i.e. minimum load experienced by the payload) by applying the dissipative force over the full known or measured available stroke length of the VPEA 30 at the time of the impact.

Figure 3:
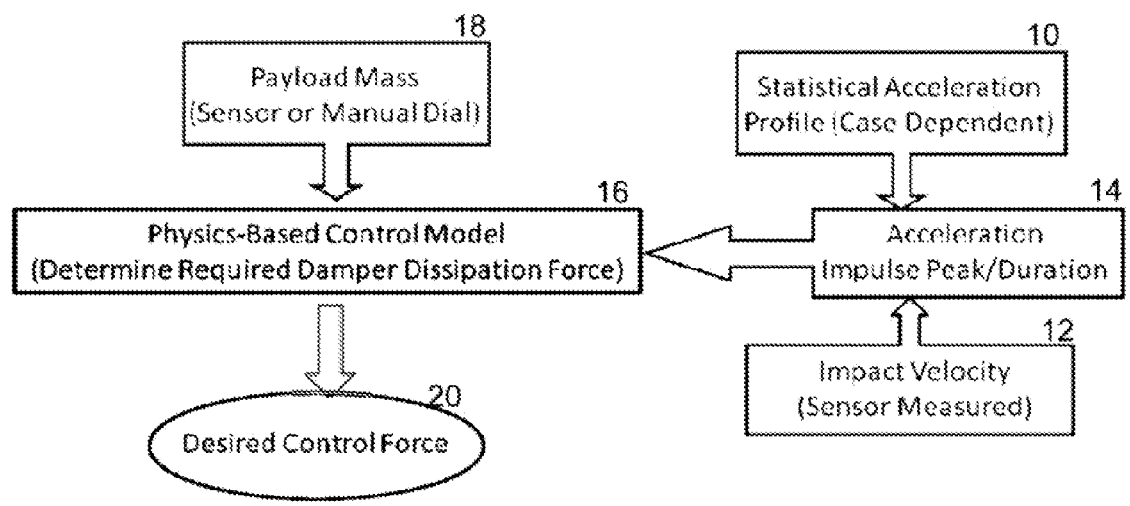
FIG. 3 is schematic illustration of a system flow diagram according to the present invention.
Figure 4:
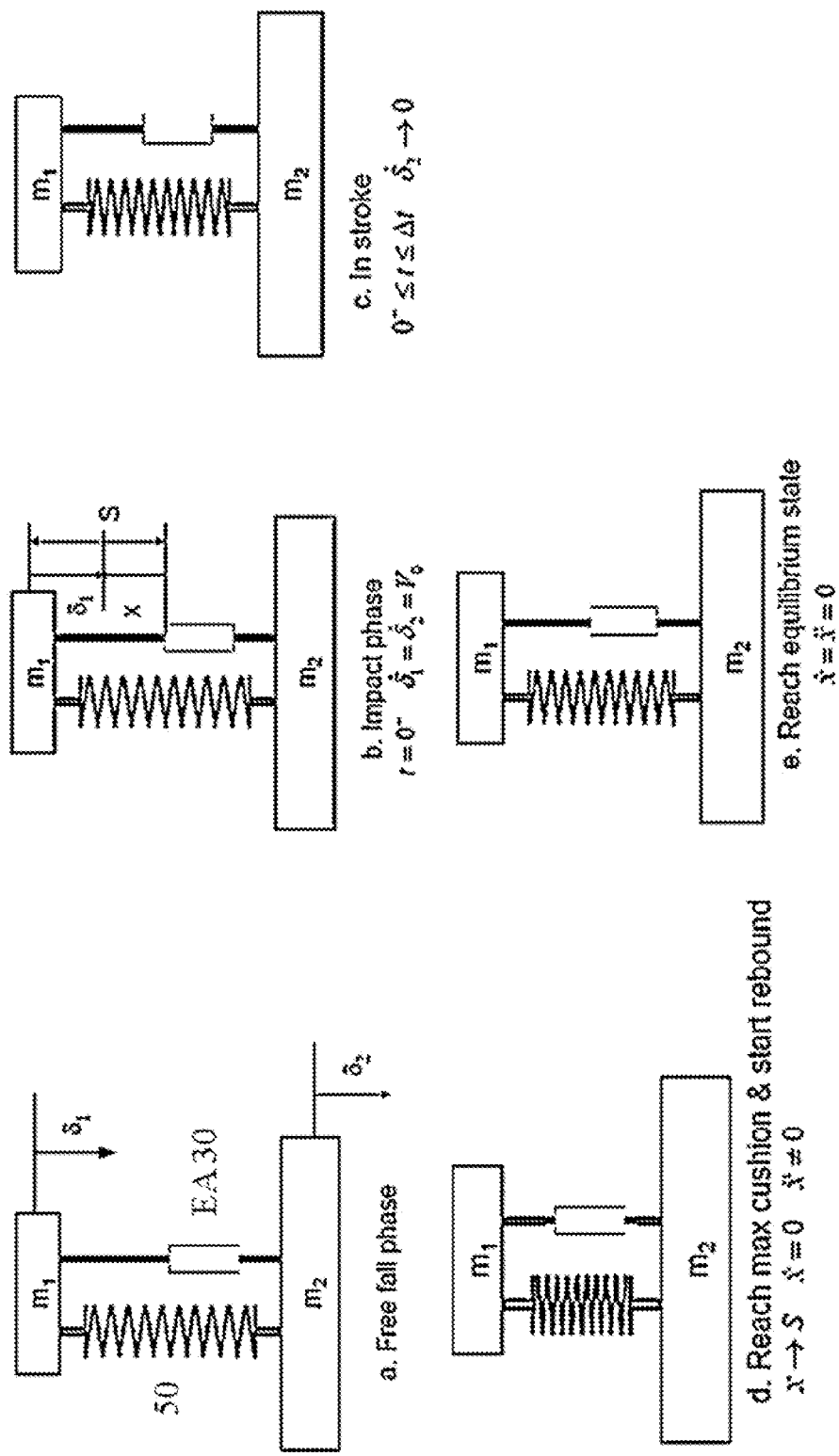
FIG. 4a is a diagram of the free fall phase of a drop impact event.
FIG. 4b is a diagram of the impact phase of a drop impact event.
FIG. 4c is a diagram of the in-stroke phase of a drop impact event.
FIG. 4d is a diagram of the max cushion/rebound portion of a drop impact event.
FIG. 4e is a diagram of the post shock equilibrium portion of a drop impact event.

The above-described process may be modeled using a single degree freedom (SDOF) mass-spring-damper (MSD) model as shown in FIG. 4 in which VPEA 30 is connected in parallel with a spring stiffness element 50 between a vehicle seat and frame. FIGS. 3a through 3e show the system responding to a free-fall-drop induced shock. With reference to those figures, the impact event begins with a free fall state for both $m_1$ and $m_2$ as shown in 3a, where $m_1$ denotes the mass of payload (here vehicle seat and occupant) and $m_2$ denotes the mass of the vehicle in which the payload is suspended. Typically, $m_2$ is much greater than $m_1$. In FIG. 3b at t=0 the impact phase begins initiating a deceleration of $m_2$ to zero velocity according to an assumed acceleration profile (e.g., half sine, triangle, square, and combined waveform in as seen in FIG. 1). The shape of the deceleration profile of the vehicle ($m_2$) resulting from the impact is a function of such things as the characteristics of the impacted surface and the material from which the vehicle is constructed, and may be selected prior to impact based on anticipated impact conditions or determined at the time of impact based on sensed impact conditions.

Also at t=0 the payload shock absorbing system begins to stroke as the velocity of $m_2$ decreases to 0 at a faster rate than the velocity of $m_1$. The (kinetic) energy of $m_1$ is stored by compression of the spring and dissipated by the EA, as shown in 3c. The maximum cushion effect ends with the maximum EA stoke when the payload descent velocity reaches zero. Because of the stored energy in the spring element of the seat system, a rebound phase will begin as shown in FIG. 3d. Finally, an equilibrium state yields when the seat system is stopped completely (FIG. 3e). The proposed MSD model captures the payload response from the impact phase 3b to the equilibrium state 3e.

During the free-fall phase as shown in FIG. 3a and through the start of the impact phase of FIG. 3b the required control force is calculated by the controller based upon the real-time measured absolute velocity of the system and accordingly applied by the EA. Upon the start of the impact phase (FIG. 3b) the peak measured absolute velocity is held by the controller as the impact velocity and the required control force is held by the controller and accordingly applied by the EA through the stroking phase (FIG. 3c) and until full desired EA stroke is utilized (FIG. 3d). The assumptions of the model are that the reaction of the impact surface/vehicle generates an acceleration impulse which can be determined by the measured impact velocity and assumed pulse profile; the payload reacts to the impulse after the impact and the payload is protected by the EA and spring element. Based on the model, the controlling equation for the forces acting on the payload in this model is $$m_1 \ddot{\delta}_1 + k(\delta_1 - \delta_2) + F_d = m_1 g \tag{1}$$

where $m_i$ is the mass of the payload, $\ddot{\delta}_1$ is the acceleration of the payload (relative to an external frame of reference), k is the spring stiffness constant, $\delta_1$ and $\delta_2$ are the displacement of payload and vehicle (within the external frame of reference), respectively, $F_d$ is the dissipative force applied by the EA on the payload, and g is the acceleration due to gravity.

Equation 1 can be rewritten with respect to $m_1$ in a frame of reference relative to $m_2$ by defining the relative displacement $(\delta_1 - \delta_2)$ as $\delta$. The relative acceleration is thus $\ddot{\delta} = \ddot{\delta}_1 - \ddot{\delta}_2$. Substitution yields:

$$m_1 \ddot{\delta} + k\delta + F_d = m_1 g - m_1 \ddot{\delta}_2 \tag{2}$$

It is further assumed that the vehicle and payload are stationary relative to one another prior to impact such that $\dot{\delta} = 0$ at t=0 and that the maximum relative displacement $\delta$ at the time of impact is the full stroke (S) of the EA (i.e. $\delta = 0$ at t=0). The mass subscript can be omitted for clarity, yielding:

$$m\ddot{\delta} + k\delta = mg - F_d - m\ddot{\delta}_2 \tag{3}$$

The acceleration of the vehicle, $\ddot{\delta}_2$, as a result of the external impact remains an unknown and must be determined in order to utilize the MSD model to calculate the necessary oppositional force to be applied by the EA to stop the payload over the full available stroke. $\ddot{\delta}_2$ remains in the external frame of reference. Knowing the anticipated shape of the acceleration profile (e.g. the half sine profile in the first example, below) and impulse duration (typically from 50 ms to 300 ms), which are predetermined as noted above, and having measured the impact velocity which is represented by the area under the acceleration profile, the amplitude of the acceleration can be impulse determined. With this information, the external forces acting on the system, i.e. the right hand side of the governing equation (eq. 3), can be written as a function of time as:

$$F(t) = \begin{cases} mg - F_d + mG\sin(\omega t) & 0 \le t \le t_1 \\ mg - F_d & t > t_1 \end{cases} \tag{5}$$

where $t_1$ is the duration of the pulse and G and $\omega$ are the acceleration amplitude and impulse radian frequency, respectively.

Duhamel's integral, as seen in equation 6, represents the total displacement produced by the exciting forces acting on the un-dampened system; gives the displacement of the payload as a function of time:

$$\delta(t) = \frac{1}{m\omega_n} \int_0^t F(\tau) \sin \omega_n (t - \tau) d\tau \tag{6}$$

where $\omega_n$ is the natural frequency of the un-dampened MSD system, defined as $$\omega_n = \sqrt{\frac{k}{m}},$$

such that the displacement solution is given by $$\delta(t) = \begin{cases} \frac{mg - F_d}{k}[1 - \cos\omega_n t] + & 0 < t \le t_1 \\ \frac{G}{\omega_n^2 - \omega^2}[\sin(\omega t) - \omega/\omega_n \sin(\omega_n t)] & \\ \frac{mg - F_d}{k}[1 - \cos\omega_n t] - & t > t_1 \\ \frac{G}{\omega_n^2 - \omega^2} \frac{\omega}{\omega_n}[\sin(\omega_n(t - t_1)) + \sin(\omega_n t)] & \end{cases} \tag{7}$$

Recalling that the goal of the system in this preferred embodiment is to minimize the maximum force experienced by the payload by accelerating the payload to zero velocity over the longest possible distance (the full available stroke (S) of the EA), equation 7 is determined for each of these conditions (i.e. zero velocity and full stroke displacement). Alternate embodiments as described below may have a desired stroking distance less than the full available stroke of the EA. It is assumed that the duration of the acceleration impulse profile is short such that neither zero velocity nor full stroke displacement are reached until a time t that is greater than $t_1$. For the zero velocity condition, the first derivative of the displacement solution (Equation 7) is taken to obtain the velocity solution, which is set to zero and then solved for $F_d$, yielding:

$$F_{dv} = mg - k\frac{G\omega}{\omega_n^2 - \omega^2} \frac{[\cos(\omega_n(t - t_1)) + \cos(\omega_n t)]}{\omega_n \sin(\omega_n t)} \tag{8}$$

where $F_{dv}$ represents the EA force necessary for the payload to reach zero velocity at any time t.

Similarly, for the full stroke condition, the displacement solution is set to S and solved for $F_d$, yielding:

$$F_{ds} = mg - k\frac{S + \frac{G}{\omega_n^2 - \omega^2} \frac{\omega}{\omega_n}[\sin(\omega_n(t - t_1)) + \sin(\omega_n t)]}{1 - \cos(\omega_n t)} \tag{9}$$

where $F_{ds}$ represents the EA force necessary for the payload to reach displacement S at any given time t.

The intersection of the curves of force equations 8 and 9 represents the time t where both zero velocity and full displacement are reached simultaneously. Equating equations 8 and 9 and solving for t yields:

$$\omega_n t = \pi - 2\phi_2 \quad (10)$$

where $$\phi_1 = \omega_n t_1;$$

$$a = \frac{G\frac{\omega}{\omega_n}}{\omega_n^2 - \omega^2}\sin\phi_1 - S;$$

$$b = \frac{G\frac{\omega}{\omega_n}}{\omega_n^2 - \omega^2}(1 + \cos\phi_1);$$

$$\phi_2 = \arctan\left(\frac{b}{a}\right)$$

The required EA force ($F_d$) can then be calculated at time t using either Equation 8 or 9.

A second Example is offered in which the triangular impact acceleration profile of FIG. 1a is pre-selected. By assuming the triangular acceleration pulse, the force in the right hand side of governing equation (eq. 3) can be expressed as $$F(t) = \begin{cases} mg - F_d + m\frac{2G}{t_1}t & 0 < t \le \frac{t_1}{2} \\ mg - F_d + m\frac{2G}{t_1}(t - t_1) & \frac{t_1}{2} < t \le t_1 \\ mg - F_d & t > t_1 \end{cases} \quad (11)$$

where $t_1$ is the duration of the pulse and G is again the peak acceleration amplitude. As with the half-sine case above, the displacement solution is given by:

$$\delta(t) = \begin{cases} \frac{mg - F_d}{k}(1 - \cos\omega_n t) + \frac{G}{\omega_n^2}\left[t - \frac{\sin\omega_n t}{\omega_n}\right] & 0 < t \le \frac{t_1}{2} \\ \frac{mg - F_d}{k}(1 - \cos\omega_n t) - \frac{G}{\omega_n^2}(t - t_1) + & \frac{t_1}{2} < t \le t_1 \\ \frac{G}{\omega_n^3}[2\sin\omega_n(t - t_1/2) - \sin\omega_n t] & \\ \frac{mg - F_d}{k}(1 - \cos\omega_n t) + & t > t_1 \\ \frac{G}{\omega_n^3}[2\sin\omega_n(t - t_1/2) - \sin\omega_n t - \sin\omega_n(t - t_1)] & \end{cases} \quad (12)$$

Again recalling that the goal of the system in this preferred embodiment is to minimize the maximum force experienced by the payload by accelerating the payload to zero velocity over the longest possible distance (the full available stroke (S) of the EA), the displacement solution is determined for each of these conditions. It is again assumed that the duration of the acceleration impulse profile is short such that neither zero velocity nor full stroke displacement are reached until a time t that is greater than $t_1$. The derivative of the displacement solution (Equation 12) is taken to obtain the velocity solution which is set to zero and solved for $F_d$, yielding:

$$F_{dv} = mg + k\frac{G}{\omega_n^2}\frac{[2\cos\omega_n(t - t_1/2) - \cos\omega_n t - \cos\omega_n(t - t_1)]}{1 - \cos(\omega_n t)} \quad (13)$$

where $F_d$ represents the EA force necessary for the payload to reach zero velocity at any time t.

Similarly, for the full stroke condition, the displacement solution is set to S and solved for $F_d$, yielding:

$$F_{ds} = mg + k\frac{-S + \frac{G}{\omega_n^3}[2\sin\omega_n(t - t_1/2) - \sin\omega_n t - \sin\omega_n(t - t_1)]}{1 - \cos(\omega_n t)} \quad (14)$$

where $F_d$ represents the EA force necessary for the payload to reach displacement S at any given time t.

As with the half-sine case, the time t at which the two curves intersect is obtained by equating Equations 13 and 14, solving to yield:

$$\omega_n t = \pi - 2\phi_2 \text{ where} \quad (15)$$

$$\phi_1 = \omega_n t_1/2;$$

$$a = \frac{G}{\omega_n^3}(2 - 2\cos\phi_1)\sin\phi_1 + S;$$

$$b = \frac{G}{\omega_n^3}(2 - 2\cos\phi_1)\cos\phi_1;$$

$$\phi_2 = \arctan\left(\frac{b}{a}\right)$$

The required EA force ($F_d$) can then be calculated at time t using either Equation 13 or 14. The same methodology is applied to other impulse shapes to determine the appropriate $F_d$ for that case.

With reference to FIG. 4, the control methodology is implemented in an exemplary adaptive energy absorption system 100 by controller 60 which controller may comprise a processor, as well as a memory for storing one or more control algorithms described herein for execution by the processor, as well as the force acceleration profiles. The memory also stores data that may be used and/or produced by execution of the one or more control algorithms. Controller 60 interfaces with, receives, and stores in memory measurement signals (controller inputs) from one or more sensors (70a, 70b, ... 70n) and/or weight indication mechanism 72, as described below. Based on processing performed, controller 60 interfaces with, and generates one or more control signals (controller outputs) to control one or more components of system 100 (e.g., variable profile energy absorber (VPEA) 30).

System 100, in the described embodiment, is provided for a vehicle seat 20 which together with the occupant comprises the payload of the system. An adaptive energy absorber or variable profile energy absorber (VPEA) 30 may be operatively connected to vehicle seat 20, and to a base 10 of a vehicle (frame or extension thereof). VPEA 30 may comprise an active valve damper, a magnetorheological (MR) fluid damper, an electrorheological (ER) fluid damper, or other adjustable energy absorber. VPEA 30 may be preferably provided in combination with a stiffness element 50 (e.g., a coil spring, leaf spring, viscoelastic material, etc.) in any number of configurations. In various implementations, VPEA 30 may also be provided alone, or in combination with a fixed profile energy absorber (FPEA) 40 (e.g., wire-bender, composite crushable tube, etc.). One or more components of system 100 may be powered by a power source 90 such as a battery system.

As described, certain sensors (70*a*, 70*b*, . . . 70*n*) are provided to yield real-time motion information in the CFC system. In a preferred embodiment, at least one sensor is provided on the payload and one sensor on the vehicle so that the input load levels as well as motion of the payload (both absolute & relative) may be determined. These sensors may measure force (load cells), acceleration (accelerometers), velocity (PVTs, etc.), or strain/displacement (LVDT, strain gauge, etc). A velocity sensor or an accelerometer can be used to determine the impact velocity along with the assumed pulse profile. The payload mass may be determined by a displacement sensor based on the static deflection in the spring element.

The controller 60 software control scheme and methodology can be summarized by the following sequence:
1. Determine system parameters
   a. Predetermine, sense or input payload information (mass) by, e.g. sensing static displacement in the spring element
   b. Sense vehicle velocity e.g. by accelerometers, PVTs, aircraft instrumentation
   c. Sensed values transmitted to processor
2. Determine impulse characteristics
   a. Shape and duration are prescribed based on different applications
   b. Peak impulse g level determined by processor based on measured impact velocity and known shape and duration of impulse.
3. Calculate by processor required oppositional force.
4. Signal EA to apply and maintain calculated constant force until the maximum displacement and zero velocity conditions are met.

Figure 5:
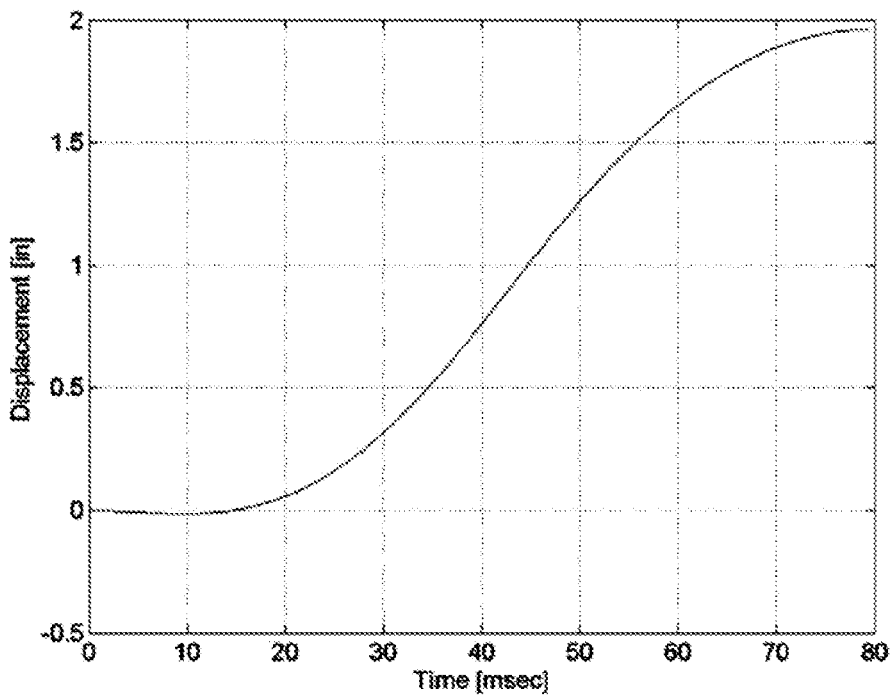
FIG. 5 depicts the displacement and velocity curves of a simulated shock event.
Figure 5:
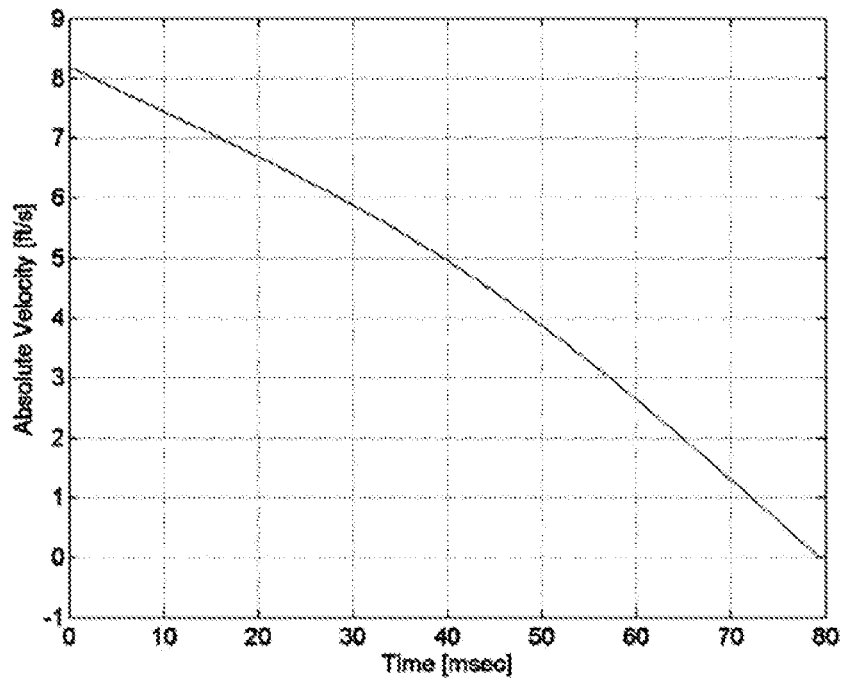

Displacement and velocity simulations were conducted based on the prescribed methodology for a case simulating an impact producing an 8 g, 50 ms half-sine pulse profile for a payload mass of 293 lb (50th percentile male plus stroking seat mass) with an available stroke of 1.875 inches. The resulting displacement and velocity curves are depicted in FIG. 5. The required total EA force was determined to be 4350 N. Under this applied force the payload reaches zero velocity at 78 ms after impact and approximately 1.8 in. damper stroke. A maximum stroke length of 1.8 inches was utilized to ensure no end-stop impact.

Figure 6:
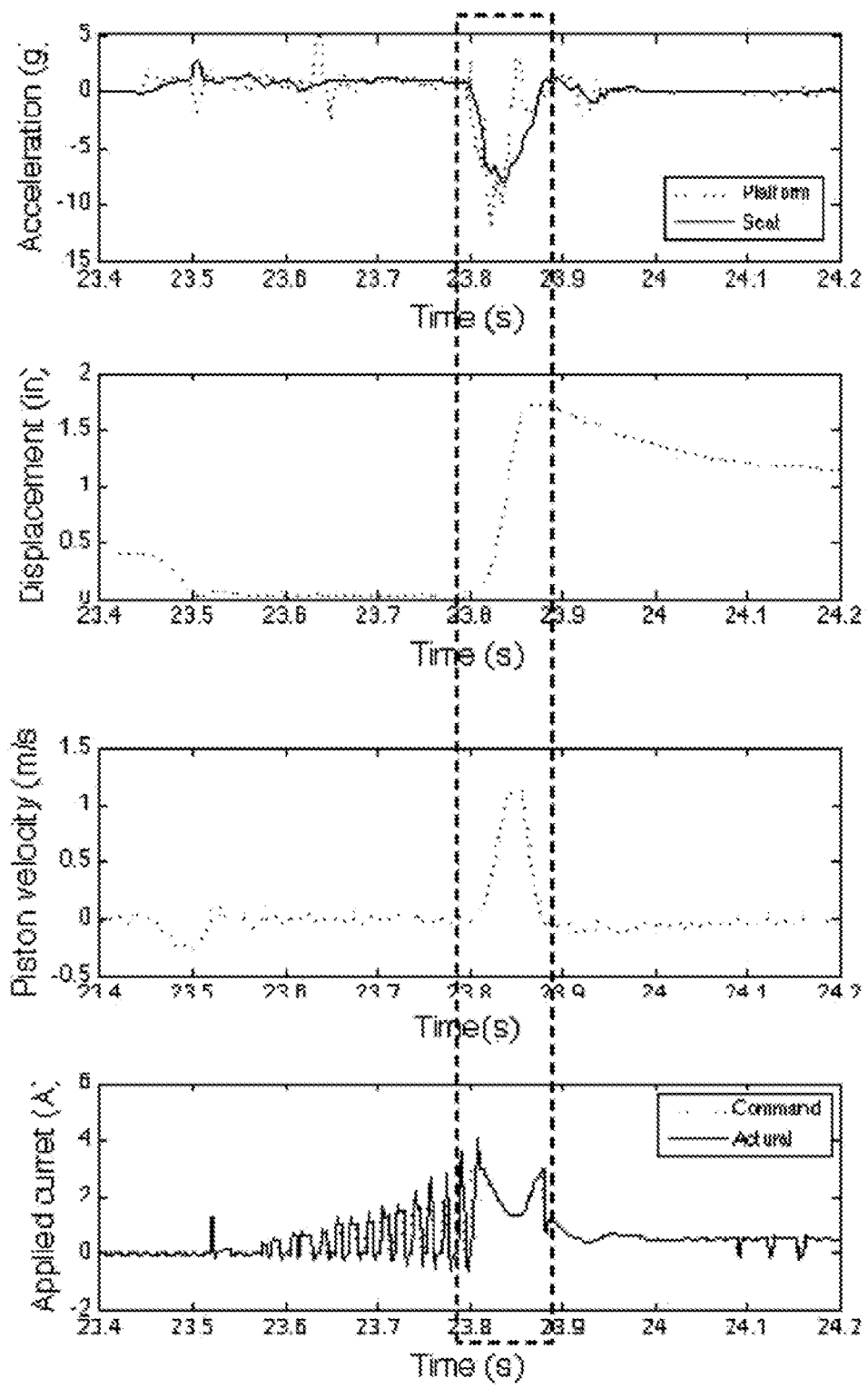
FIG. 6 depicts the acceleration, displacement, piston velocity and applied current of an experimental shock event.
Figure 7:
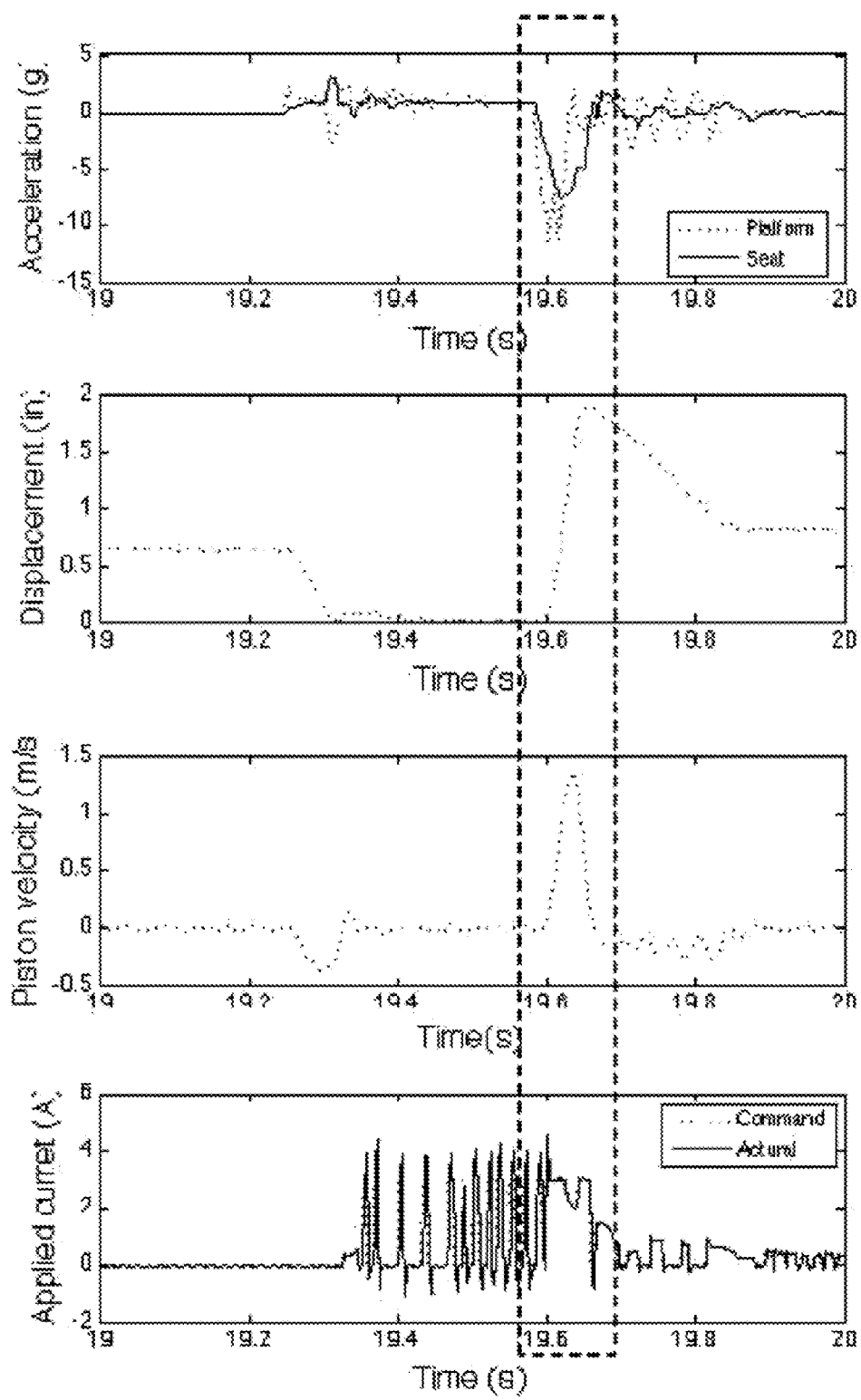
FIG. 7 depicts the acceleration, displacement, piston velocity and applied current of a second experimental shock event.

In order to further validate the constant force control system an experimental drop test was conducted in which the control scheme was experimentally validated for both a $5^{th}$ percentile female (109 lbs) and a $50^{th}$ percentile male (293 lbs) payload under 10 g drop in the hardware-in-the-loop simulation test. Test results for the female and male subjects are depicted in FIG. 6 and FIG. 7, respectively, in which the dashed zone indicates the shock period. The constant force was pre-determined by the control algorithm based on the real-time measured impact velocity and payload mass under a specified 1.8 inch available stroke assuming a 50 millisecond duration and half-sine acceleration profile. In this test a magneto-rheological (MR) damper was used to represent the EA system, with damping force controlled via current determined and applied by the controller. Based on the determined constant force, a command current was determined by the controller and applied to MR damper. The MR damper stroke was close to 1.8 in. and the payload (seat) acceleration level showed 30 percent reduction compared to the platform acceleration level. The output current applied on the damper matched well with the command current. Similarly, in FIG. 7, the MR damper stroke was close to 1.9 in. and the payload (seat) acceleration level showed 30 percent reduction from the platform. The output current applied on the damper matched well with the command current indicating that the actual electrical current applied to the damper matched the command signal such that the proper damper force was likely applied.

In an alternate embodiment of the present invention, the maximum stroke of the EA may be beneficially limited to less than the maximum available stroke under certain conditions such as when a spring having a high spring constant k is implemented in the system. In such a situation utilizing the full stroke of the damper could lead to high spring forces being transmitted to the payload and thus resulting in less than optimal load reduction for the system. To compensate for this problem the controller would determine an optimum stroke $\bar{\delta}$ (to limit the force stored in the spring), and then utilize $\bar{\delta}$ for S in the above determination of $F_d$. To determine $\bar{\delta}$, the kinetic energy of the impact is equated to the potential energy stored in the spring (Hooke's Law) plus the energy dissipated by the viscous dampening component of the MR dampener (known for a particular chosen damper), yielding:

$$\frac{1}{2}mv_0^2 = \frac{1}{2}k \cdot \bar{\delta}^2 + \frac{1}{2}Cv_0 \cdot \bar{\delta} \tag{16}$$

where C is the known dampening coefficient of the MR dampener and $v_0$ is the measured impact velocity.

Solving for $\bar{\delta}$ yields:

$$\bar{\delta} = \frac{Cv_0}{2k} + \sqrt{\left(\frac{Cv_0}{2k}\right)^2 + \frac{mv_0^2}{k}}$$

$\bar{\delta}$ can then be determined based on the known or measured values of all variables at impact and utilized as the value for S in, for example, equations 9 or 14 above when determining the required EA force. In certain further situations such as where a long duration pulse is experienced, a control gain $\gamma_{control}$, to increase or decrease the anticipated acceleration due to impact and thus the resulting force to be applied by the damper. The modified anticipated acceleration $\alpha_{control}$ is determined by:

$$\alpha_{control} = \gamma_{control} v_0 \omega_{nd}$$

$$\text{where } \omega_{nd} = \sqrt{\frac{k}{m}(1-\zeta^2)} \text{ and } \zeta = \frac{C}{2\sqrt{km}}$$

$\gamma_{control}$ can be varied depending on the measured impact velocity and/or anticipated deceleration but is generally a predefined value but will typically be chosen for the particular device or application and remain unchanged.

Figure 8:
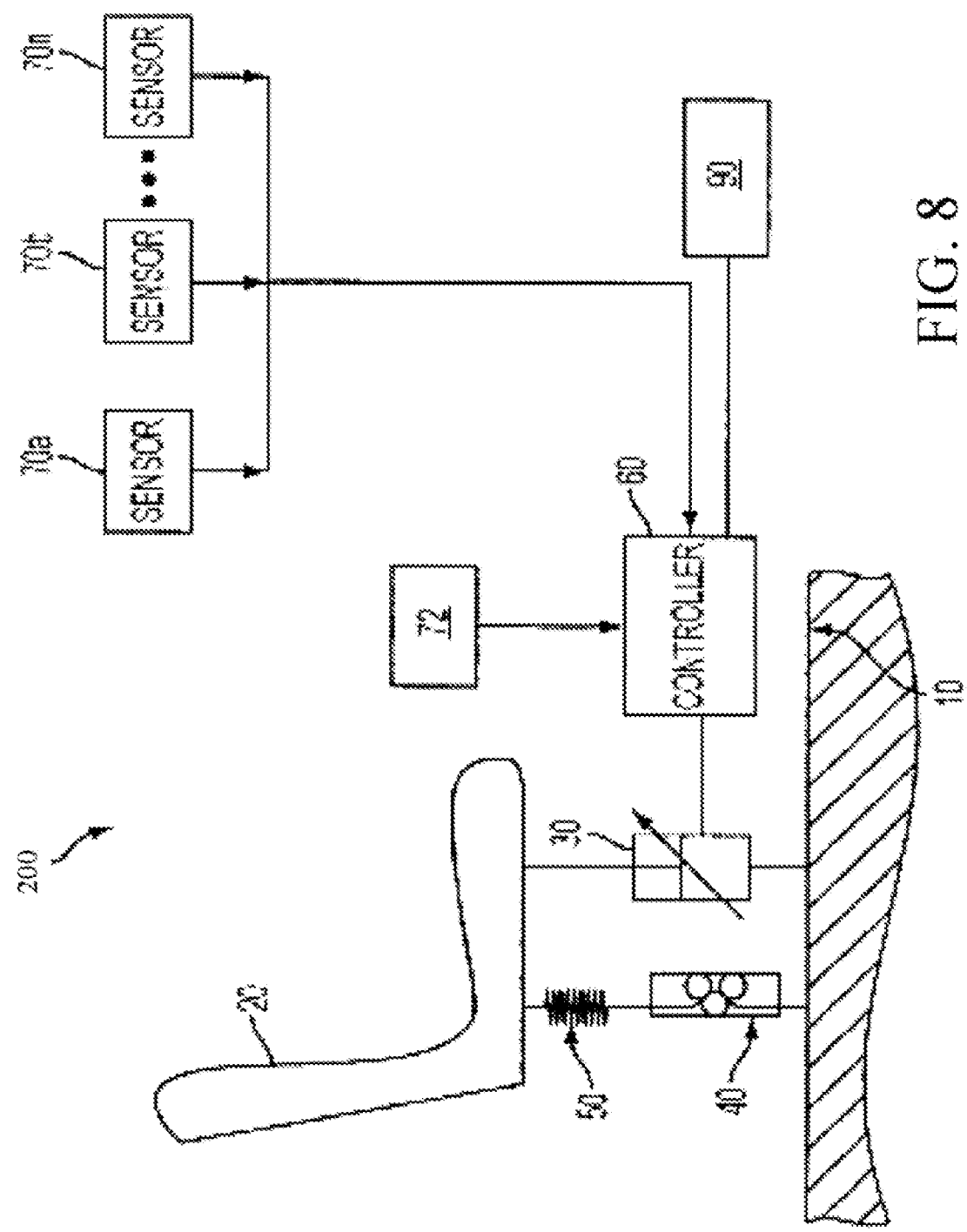
FIG. 8 is an illustration of an alternate embodiment of an adaptive energy absorption system 200 for a vehicle seat, in which VPEA 30 is provided in parallel with a series spring and fixed profile energy absorber (FPEA) 40.

FIG. 8 is an illustration of an alternate embodiment of an adaptive energy absorption system 200 for a vehicle seat, in which VPEA 30 is provided in parallel with a series-connected stiffness element 50 (coil spring) and a fixed profile energy absorber (FPEA) 40. The VPEA 30 is operatively connected between vehicle seat 20 and base 10, and stiffness element 50 and FPEA 40 are connected in series between the vehicle seat 20 and the supporting structure of the vehicle. Stiffness element 50 and FPEA 40 are primarily for vibration isolation and recoil/return, while VPEA 30 protects against shock from impact as described above, and is also capable of vibration isolation. In this configuration the system 200 may be configured as a dual-mode system, mitigating both vibration as well as impact shock, and controller 60 may be configured to switch VPEA 30 between shock and vibration modes. The method of operation in shock mode would be as described above in regard to FIGS. 1-7. It should now be apparent that the above-described control system and method for operation according to the present invention is widely applicable to most any payload shock damping applications in order to successfully minimize shock energy with any variable (controlled) absorption element of known stroke length.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims and may be used with a variety of materials and components. This application is therefore intended to cover any variations, uses, or adaptations of the invention using its general principles. Further, this application is intended to cover such departures from the present disclosure as come within known or customary practice in the art to which this invention pertains.

We claim:

1. A method of controlling a variable profile energy absorber of known available stroke to minimize acceleration of a vehicle payload during a vehicle shock event comprising the steps of
    providing a means for inputting, storing, and/or sensing a mass of said payload;
    providing a means of sensing a velocity selected from the group consisting of a vehicle velocity in a vertical direction and a payload velocity in a vertical direction;
    transmitting said sensed velocity to an energy absorber controller;
    determining by said controller based on said sensed velocity, a predetermined shock event induced vehicle acceleration profile with an anticipated shock event duration and peak amplitude of the acceleration of said vehicle due to said shock event;
    defining a first force necessary to be applied by said energy absorber to said payload to decelerate said payload to a substantially zero payload velocity in a vertical direction at any time after said shock event;
    defining a second force necessary to be applied by said energy absorber to said payload to displace said payload to a predetermined stroke position at any time after said shock event;
    determining based on said definition of said first force and said definition of said second force a time at which said first force is substantially equal to said second force;
    calculating from said definition of said first force or said definition of said second force a value of total force at said determined time;
    applying a control signal to said variable profile energy absorber to induce said energy absorber to apply said total force to said payload.

2. A method of controlling a variable profile energy absorber of known available stroke to minimize acceleration of a payload in a vehicle during a vehicle shock event comprising the steps of
    inputting, storing, and/or sensing a mass of said payload;
    sensing a velocity selected from the group consisting of a vehicle velocity and a payload velocity;
    determining as a function of time a first force necessary to accelerate said payload to substantially zero velocity relative to said vehicle;
    determining as a function of time a second force necessary to displace said payload with respect to said vehicle a distance equal to a predetermined amount of stroke of said energy absorber;
    determining a time t where said first force is substantially equal to said second force;
    determining a value of said first or second force at said time t;
    applying a control signal to said variable profile energy absorber to induce the application of said determined force value.

3. A system for controlling the application of force on a payload by a variable profile energy absorber in a vehicle comprising
    a controller including memory for storing a mass of said payload;
    at least one sensor for sensing a velocity value selected from the group consisting of a vehicle velocity value and a payload velocity value and transmitting said velocity value to said controller, said controller having a memory for storing transmitted values and a processor for determining from at least said stored values a first force as a function of time necessary to displace said payload with respect to said vehicle a distance equal to a predetermined amount of stroke of said variable profile energy absorber and a second force as a function of time necessary to accelerate said payload to substantially zero velocity relative to said vehicle; said processor further determining a time t where said first force is substantially equal to said second force and calculating a value of said first or second force at said time t;
    said controller further comprising means for signaling said variable profile energy absorber to apply a force equal to said calculated value of said first or second force.

4. A system for controlling the application of force on a payload of claim 3 wherein the mass of said payload is a fixed and predetermined value.

5. A system for controlling the application of force on a payload of claim 3 wherein the mass of said payload is manually set.

6. A system for controlling the application of force on a payload of claim 3 wherein the mass of said payload is sensed by one or more sensors and transmitted to the controller.

7. An adaptive energy absorption system for a vehicle seat for mitigating injury to an occupant of the vehicle seat during a vehicle shock event, the system comprising:
    a variable profile energy absorber operatively connected to said vehicle and to said vehicle seat;
    a controller including a memory storing a mass of said payload;
    at least one sensor for sensing a velocity value selected from the group consisting of a vehicle velocity and a payload velocity and transmitting said velocity value to said controller;
    said controller further comprising a memory for storing transmitted values and a processor for determining from at least said stored values a first force as a function of time necessary to displace said payload with respect to said vehicle a distance equal to the available stroke of said variable profile energy absorber and a second force as a function of time necessary to accelerate said payload to zero velocity relative to said vehicle; said processor further determining a time t where said first force is equal to said second force and calculating a value of said first or second force at said time t, said controller further comprising a signal generator for generating a control signal causing said variable profile energy absorber to apply a force equal to said calculated value of said first or second force.

8. An adaptive energy absorption system for a vehicle seat of claim 7 wherein the mass of said payload is a fixed and predetermined value.

9. An adaptive energy absorption system for a vehicle seat of claim 7 wherein the mass of said payload is manually set.

10. An adaptive energy absorption system for a vehicle seat of claim 7 wherein the mass of said payload is sensed by one or more sensors and transmitted to the controller.

11. A payload shock damping control system for minimizing impact shock energy between a payload and a supporting structure during an impact event, comprising:
   a processor including memory for storing a plurality of shock acceleration profiles;
   a variable impact force absorption element coupled between said payload and supporting structure, and in communication with said processor, said variable impact force absorption element having a known stroke length;
   a sensor in communication with said processor for measuring impact velocity of said payload or supporting structure; and
   software stored in said memory and executable by said processor for determining from said sensor impact velocity of said payload or supporting structure at impact, with reference to a selected one of said plurality of shock acceleration profiles, determining an anticipated peak impulse level of said supporting structure resulting from said impact, calculating a maximum oppositional force of said variable impact force absorption element that can be applied over its known stroke length between said payload and supporting structure to maximize shock mitigation over the duration of said impact event, and outputting a signal to said variable impact force absorption element to apply and maintain said calculated oppositional force.

* * * * *